UNITED STATES PATENT OFFICE.

CHARLES GIBSON, OF CHICAGO, ILLINOIS, ASSIGNOR TO HIMSELF AND THE NORTH WESTERN FERTILIZING COMPANY, OF SAME PLACE.

PROCESS OF MAKING A FERTILIZER FROM TANK-WATERS.

SPECIFICATION forming part of Letters Patent No. 324,103, dated August 11, 1885.

Application filed July 8, 1884. (No specimens.)

*To all whom it may concern:*

Be it known that I, CHARLES GIBSON, of Chicago, in the county of Cook and State of Illinois, have invented a new and improved process of treating the tank-waters from slaughter-houses and other refuse waters for the recovery and preparation of fertilizing substances, of which the following is a full, clear, and exact description.

The tank or refuse waters of slaughter-houses, packing and rendering houses, and other industrial establishments, contain substances which are valuable as fertilizers, but which are wasted, owing to the difficulty of recovering them in suitable condition for such use, the difficulty arising from the fact that these substances are for the most part held in solution and not in suspension.

The valuable parts consist of gelatine, and kindred substances which have been so much altered in their properties by the high temperature to which they have been exposed that they have lost the power of gelatinizing, and when the solutions are boiled down the residue remains a semi-fluid and sticky mass, even when cold, highly deliquescent, so that it cannot be dried by any usual methods, such as are used for drying glue. Neither can the mass be evaporated to a condition that would allow its reduction to powder, and, were that possible, the material would in a short time absorb moisture enough to return it to a semi-liquid condition.

The object of my invention is to evaporate these waters and to extract and dry the valuable substances held in solution, rendering them in such a state that they can be reduced to a powder which will be permanent or no longer deliquescent, thus producing an article available as an ammoniate for admixture with ordinary commercial fertilizers, and for use alone as a fertilizer.

To these ends I employ the following process: The collected waters are run into an evaporator, which may be heated by steam in coils, by a steam-jacket, or by a fire beneath. Before commencing the evaporation the waters are treated by evaporating a small weighed quantity to absolute dryness for the purpose of ascertaining the percentage of solid matters, and to the liquid in the evaporator there is to be added any of the acid sulphates of the alkalies, preferably acid sulphate of soda, in the proportion of one-quarter or twenty-five per cent., by weight, of the solid matters, as indicated by the preliminary test. The waters are then concentrated by evaporation as rapidly as possible. When the concentration has progressed to a short extent, the same weight—one-fourth of sulphate of alumina or aluminous cake—is added to the mass, and the evaporation is continued until the solution of the salts of the alkali and alumina is so strong that it separates from the animal matters previously in solution, and the liquid itself is no longer capable of holding the whole of the salts in solution even at the boiling temperature. This point of separation being reached, the whole residue is run into a vat that is provided with stirrers or agitators, and the mass is therein thoroughly worked up until the quantity of concentrated solution of the salts of the alkali and the alumina which may have separated and fallen is worked into the mass. At the same time a quantity of either the carbonates, oxides, or hydrates of the alkalies or alkaline earths, by preference hydrate of lime in a powdered state, is added to the mass, enough to neutralize the free vitriol and reduce the acid sulphate to a neutral sulphate. In practice I find the best quantity to be about ten per cent. of the solids in the original waters.

After the ingredients have been thoroughly incorporated the mass, which is a thick paste and can easily be handled by shovels, is removed from the tank and placed on a cold floor, and after becoming cool can be readily broken into fragments and ground, if desired, to a powder.

In place of the acid sulphate of an alkali, a neutral sulphate may be used, provided enough vitriol is also used to convert the neutral to an acid sulphate. Niter-cake and salt-cake are both good substitutes for the acid sulphate. The acid sulphate of the alkalies serves, first, to neutralize and retain any free ammonia which the waters may contain, which is often considerable; second, the acid sulphates do not form alums with the aluminous cake or sulphate of alumina to any great extent until the excess of vitriol has been removed by the carbonate oxide or hydrate of an alkali or alkaline earth that is added in the agitator; and, besides, they are much more soluble than the neutral sulphates, and therefore allow a greater quantity of water to be evaporated before commencing to precipitate after the acid sulphates have been changed into neutral sulphates by the addition of a carbonate, oxide, or hydrate of an alkali or alkaline earth. Alums are then formed and take up as water of crystallization nearly all the moisture which remains in the combined substances. These alums, being in a finely-divided state, and dispersed throughout the mass, cause it to set into a solid, especially when cold, and deprive the animal matters of all tendency to stickiness.

I prefer to add the acid sulphate as soon as the waters have been collected, whether in store-tanks or in the evaporator, as, in addition to its chief uses, indicated above, the acid sulphate acts as a preservative and prevents putrefaction and the generation of bad odors.

I am aware that sulphate of alumina has been used in the treatment of sewage and tank-waters; but the object has always been to precipitate the substances held in suspension. Such a process is wholly inapplicable for the purpose intended by my process.

I am aware that lime, potash, and other alkaline substances have been added to sewage for the purpose of precipitating the solid matter suspended therein, and the precipitate thus obtained been dried to adapt it for convenient and economical transportation and use as a fertilizer; but such process cannot be successfully applied to tank-water, since the solid matter in the latter, which is of most value as a fertilizer, is held in solution, not suspension, and should not be precipitated, and also the chemical substances employed should not be decomposed.

Having thus fully described my invention, I claim as new and desire to secure by Letters Patent—

1. The hereinbefore-described process of preparing fertilizing material from the tank-waters of slaughter-houses and other establishments, which consists in adding acid sulphate of an alkali, aluminous cake, or sulphate of alumina to the waters, then boiling down to expel the surplus water, agitating the mass together with a carbonate, oxide, or hydrate of an alkali or alkaline earth, and finally cooling and grinding, substantially as described.

2. The hereinbefore-described process of extracting the solid or animal matters held in solution in the tank-waters from slaughter-houses and similar establishments, which consists in the addition to the waters of acid sulphate of an alkali, aluminous cake, or sulphate of alumina, evaporation to remove the excess of water, the addition to the residue of a carbonate, oxide, or hydrate of an alkali or alkaline earth, and agitation of the mass to insure the thorough intermixture, the neutralization of the sulphate, and the consequent reduction of the mass to a solid by formation of alums, as specified.

CHARLES GIBSON.

Witnesses:
W. H. BRINTNALL,
C. L. SHATTUCK.